(12) United States Patent
Kinoshita

(10) Patent No.: US 11,248,577 B2
(45) Date of Patent: Feb. 15, 2022

(54) VEHICLE POWER SUPPLY APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 81 days.

(21) Appl. No.: 16/452,095

(22) Filed: Jun. 25, 2019

(65) Prior Publication Data

US 2020/0040859 A1 Feb. 6, 2020

(30) Foreign Application Priority Data

Aug. 1, 2018 (JP) .............................. JP2018-145246

(51) Int. Cl.
- *F02N 11/08* (2006.01)
- *H02J 7/14* (2006.01)
- *B60L 50/15* (2019.01)

(52) U.S. Cl.
CPC .......... *F02N 11/0866* (2013.01); *B60L 50/15* (2019.02); *H02J 7/1423* (2013.01)

(58) Field of Classification Search
CPC .... F02N 11/0866; H02J 7/1423; B60L 50/15; B60L 50/40; B60L 50/61
USPC ....................................................... 307/10.1
See application file for complete search history.

(56) References Cited

U.S. PATENT DOCUMENTS

| | | | | |
|---|---|---|---|---|
| 2015/0329007 A1* | 11/2015 | Matsunaga | ............. | B60L 50/13 320/126 |
| 2016/0167534 A1* | 6/2016 | Suzuki | ................... | B60L 58/13 307/10.1 |
| 2016/0288651 A1* | 10/2016 | Kinoshita | ............... | B60L 58/20 |
| 2016/0288746 A1* | 10/2016 | Namuduri | ............... | F02N 11/08 |
| 2017/0182892 A1 | 6/2017 | Kinoshita | | |
| 2019/0256019 A1 | 8/2019 | Tezuka et al. | | |

FOREIGN PATENT DOCUMENTS

| JP | 2008-168754 A | 7/2008 |
|---|---|---|
| JP | 2015-180140 A | 10/2015 |
| JP | 2017-028772 A | 2/2017 |

(Continued)

OTHER PUBLICATIONS

Japanese Notice of Reasons for Refusal issued in corresponding Japanese Patent Application No. 2018-145246, dated Feb. 12, 2020, with English translation.

*Primary Examiner* — Metasebia T Retebo

(74) *Attorney, Agent, or Firm* — McDermott Will & Emery LLP

(57) ABSTRACT

A vehicle power supply apparatus includes first and second power supply systems, an electrical conduction path, a switch, and a switch controller. The first power supply system includes a first electrical energy accumulator and an electric load. The second power supply system includes a generator and a second electrical energy accumulator. The switch is configured to be controlled to a turn-on state and a turn-off state. The turn-on state includes coupling the electric load and the second electrical energy accumulator to each other, and the turn-off state includes isolating them from each other. The switch controller controls the switch to the turn-on state on the condition that the generator has an abnormality, and afterwards controls the switch to the turn-off state.

11 Claims, 11 Drawing Sheets

(56) References Cited

FOREIGN PATENT DOCUMENTS

| JP | 2017-099249 A | 6/2017 |
| JP | 2017-118699 A | 6/2017 |
| WO | 2018/078785 A1 | 5/2018 |

* cited by examiner

VEHICLE POWER SUPPLY APPARATUS

CROSS-REFERENCE TO RELATED APPLICATIONS

This application claims priority from Japanese Patent Application No. 2018-145246 filed on Aug. 1, 2018, the entire contents of which are hereby incorporated by reference.

BACKGROUND

The technology relates to a vehicle power supply apparatus to be mounted on a vehicle.

A vehicle power supply apparatus to be mounted on a vehicle includes not only an accumulator such as a lead battery and a lithium ion battery but also a generator such as an alternator and an integrated starter generator (ISG). For example, reference can be made to Japanese Unexamined Patent Application Publication (JP-A) Nos. 2008-168754, 2017-99249, and 2017-118699.

SUMMARY

An aspect of the technology provides a vehicle power supply apparatus to be mounted on a vehicle that includes an engine. The vehicle power supply apparatus includes a first power supply system, a second power supply system, an electrical conduction path, a switch, and a switch controller. The first power supply system includes a first electrical energy accumulator and an electric load coupled to the first electrical energy accumulator. The second power supply system includes a generator and a second electrical energy accumulator. The generator is coupled to the engine, and the second electrical energy accumulator is able to be coupled to the generator. The electrical conduction path is provided between the first power supply system and the second power supply system and configured to couple the first electrical energy accumulator and the second electrical energy accumulator in parallel to each other. The switch is configured to be controlled to a turn-on state and a turn-off state. The turn-on state includes coupling the electric load and the second electrical energy accumulator to each other, and the turn-off state includes isolating the electric load and the second electrical energy accumulator from each other. The switch controller is configured to control the switch to the turn-on state on the condition that the generator has an abnormality, and afterwards control the switch to the turn-off state.

An aspect of the technology provides a vehicle power supply apparatus to be mounted on a vehicle that includes an engine. The vehicle power supply apparatus includes a first power supply system, a second power supply system, an electrical conduction path, a switch, and circuitry. The first power supply system includes a first electrical energy accumulator and an electric load coupled to the first electrical energy accumulator. The second power supply system includes a generator and a second electrical energy accumulator. The generator is coupled to the engine, and the second electrical energy accumulator is able to be coupled to the generator. The electrical conduction path is provided between the first power supply system and the second power supply system and configured to couple the first electrical energy accumulator and the second electrical energy accumulator in parallel to each other. The switch is configured to be controlled to a turn-on state and a turn-off state. The turn-on state includes coupling the electric load and the second electrical energy accumulator to each other, and the turn-off state includes isolating the electric load and the second electrical energy accumulator from each other. The circuitry is configured to control the switch to the turn-on state on the condition that the generator has an abnormality, and afterwards control the switch to the turn-off state.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
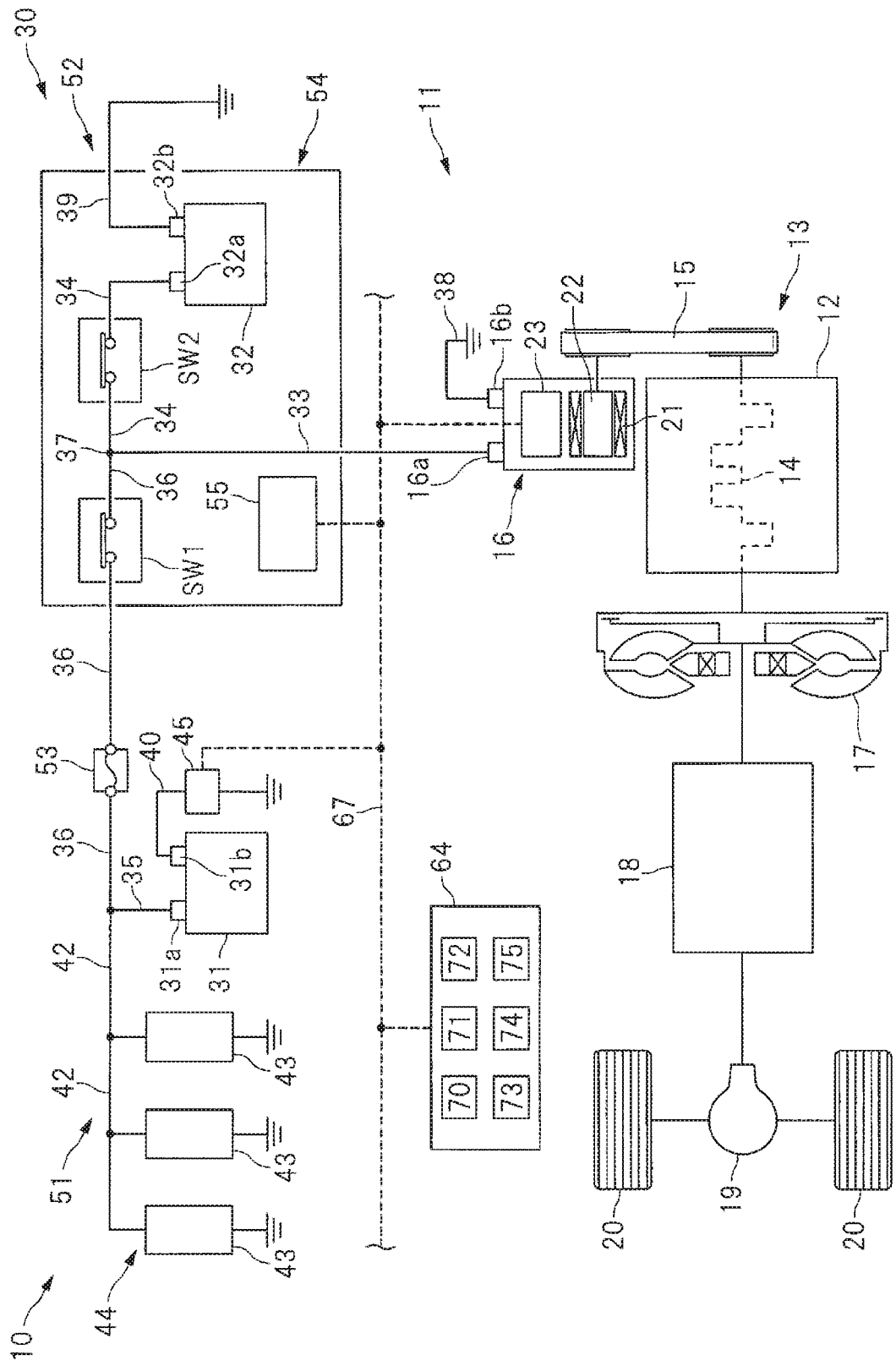
FIG. 1 is a schematic diagram of a configuration example of a vehicle on which a vehicle power supply apparatus according to one embodiment of the technology is mounted.

In the following, some preferred but non-limiting embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

In a case where a generator such as an alternator has an abnormality, it is necessary to continue electric power supply from an accumulator to various control subsystems mounted on a vehicle, in order to maintain functions of the control subsystems. However, the continuation of the electric power supply from the accumulator to the control subsystems may cause excessive discharge of the accumulator, resulting in possibility of considerable degradation in the accumulator. The degradation in the accumulator accompanying the abnormality in the accumulator may involve not only repair of the generator but also replacement of the accumulator. This may constitute a possible cause of an increase in repair cost of the vehicle power supply apparatus. What is desired is, therefore, to reduce the repair cost of the vehicle power supply apparatus even in a case where the accumulator has an abnormality.

It is desirable to provide a vehicle power supply apparatus that makes it possible to reduce repair cost of the vehicle power supply apparatus.

[Vehicle Configuration]

FIG. 1 schematically illustrates a configuration example of a vehicle 11 on which a vehicle power supply apparatus 10 according to one embodiment of the technology is mounted. Referring to FIG. 1, on the vehicle 11, a power unit 13 may be mounted. The power unit 13 may include an engine 12 that serves as a power source. The engine 12 may include a crank shaft 14 to which a starter generator 16 is coupled through a belt mechanism 15. A transmission mechanism 18 may be also coupled to the engine 12 through a torque converter 17. One or more wheels 20 may be coupled to the transmission mechanism 18 through, for example but not limited to, a differential mechanism 19.

In one embodiment of the technology, the starter generator 16 may serve as a "generator".

The starter generator 16 coupled to the engine 12 may be a so-called integrated starter generator (ISG) that serves as a generator and an electric motor. Not only may the starter generator 16 serve as the generator driven by the crank shaft 14, the starter generator 16 may also serve as the electric motor that drives the crank shaft 14. For example, the starter generator 16 may be controlled to a powering state, in a case of a restart of the engine 12 in an idling stop control, or in a case of assistance with the engine 12 at the time of, for example, a start and acceleration. Thus, the starter generator 16 may serve as the electric motor.

The starter generator 16 may include a stator 21 and a rotor 22. The stator 21 may include a stator coil. The rotor 22 may include a field coil. The starter generator 16 may further include an ISG controller 23, in order to control energized states of the stator coil and the field coil. The ISG controller 23 may include an inverter, a regulator, a microcomputer, various sensors, and other parts. Allowing the ISG controller 23 to control the energized states of the field coil and the stator coil makes it possible to control, for example but not limited to, a power generation voltage, power generation torque, and powering torque of the starter generator 16.

[Power Circuit]

Figure 2:
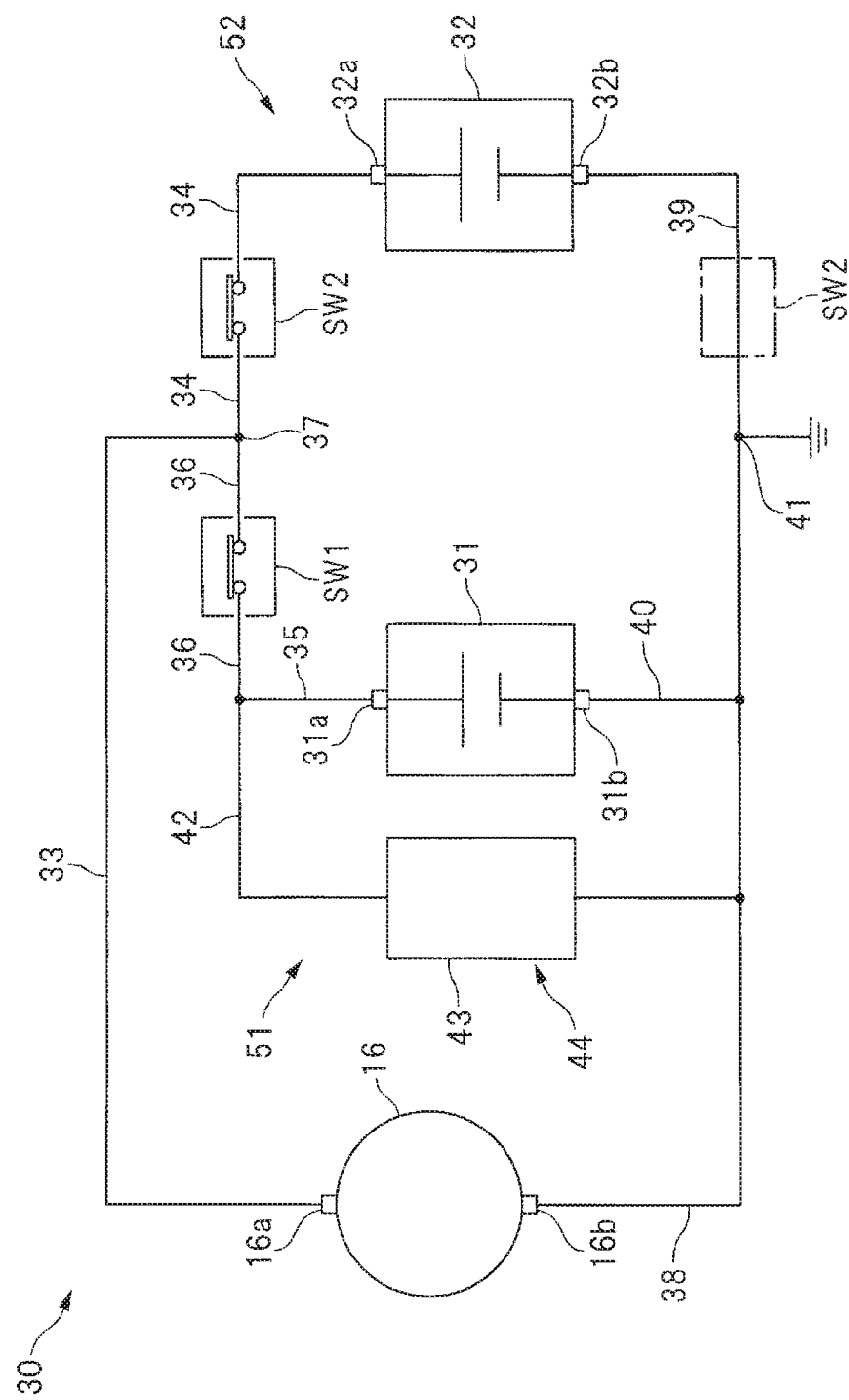
FIG. 2 is a circuit diagram of a simplified example of a power circuit.

The vehicle power supply apparatus 10 may include a power circuit 30, description of which is given below. FIG. 2 is a circuit diagram of a simplified example of the power circuit 30. Referring to FIG. 2, the power circuit 30 may include a lead battery 31 and a lithium ion battery 32. The lead battery 31 may be electrically coupled to the starter generator 16. The lithium ion battery 32 may be electrically coupled, in parallel with the lead battery 31, to the starter generator 16. It is to be noted that a terminal voltage of the lithium ion battery 32 may be higher in design than a terminal voltage of the lead battery 31, in order to positively cause discharge of the lithium ion battery 32. Moreover, internal resistance of the lithium ion battery 32 may be lower in design than internal resistance of the lead battery 31, in order to positively cause charge and the discharge of the lithium ion battery 32.

In one embodiment of the technology, the lead battery 31 may serve as a "first electrical energy accumulator". In one embodiment of the technology, the lithium ion battery 32 may serve as a "second electrical energy accumulator".

A positive electrode line 33 may be coupled to a positive electrode terminal 16a of the starter generator 16. A positive electrode line 34 may be coupled to a positive electrode terminal 32a of the lithium ion battery 32. A positive electrode line 36 may be coupled to a positive electrode terminal 31a of the lead battery 31 through a positive electrode line 35. The positive electrode lines 33, 34, and 36 may be coupled to one another through a connection point 37. Moreover, a negative electrode line 38 may be coupled to a negative electrode terminal 16b of the starter generator 16. A negative electrode line 39 may be coupled to a negative electrode terminal 32b of the lithium ion battery 32. A negative electrode line 40 may be coupled to a negative electrode terminal 31b of the lead battery 31. The negative electrode lines 38, 39, and 40 may be coupled to one another through a reference potential point 41.

As illustrated in FIG. 1, to the positive electrode line 35 of the lead battery 31, coupled may be a positive electrode line 42. To the positive electrode line 42, coupled may be a group of electric devices 44 including electric devices 43 such as various actuators and various controllers. Moreover, on the negative electrode line 40 of the lead battery 31, provided may be a battery sensor 45. The battery sensor 45 may have a function of detecting a charge state and a discharge state of the lead battery 31. Non-limiting examples of the charge state and the discharge state of the lead battery 31 may include a charge current, a discharge current, the terminal voltage, a state of charge SOC of the lead battery 31. It is to be noted that the state of charge SOC refers to a ratio of an amount of charged power to a designed capacity of a battery. In other words, the state of charge SOC means a ratio of an amount of remaining electrical energy to a full charge capacity of a battery.

In one embodiment of the technology, the electric devices 43 may each serve as an "electric load".

The power circuit 30 may include a first power supply system 51 and a second power supply system 52. The first power supply system 51 includes the lead battery 31 and the electric devices 43. The second power supply system 52 includes the lithium ion battery 32 and the starter generator 16. The lead battery 31 and the lithium ion battery 32 are coupled in parallel to each other through the positive electrode line 36 provided between the first power supply system 51 and the second power supply system 52. On the positive electrode line 36, provided may be an electric power fuse 53 and a switch SW1. The electric power fuse 53 is configured to be melted down by an excessive current. The switch SW1 is configured to be controlled to an ON state and an OFF state. Moreover, on the positive electrode line 34 of the lithium ion battery 32, provided may be a switch SW2. The switch SW2 is configured to be controlled to an ON state and an OFF state.

In one embodiment of the technology, the positive electrode line 36 may serve as an "electrical conduction path". In one embodiment of the technology, the switch SW1 may serve as a "switch" and a "first switch". In one embodiment of the technology, the switch SW2 may serve as a "switch" and a "second switch". In one embodiment of the technology, the ON state of the switch SW1 may serve as a "turn-on state", and the OFF state of the switch SW1 may serve as a "turn-off state". In one embodiment of the technology, the ON state of the switch SW2 may serve as a "turn-on state", and the OFF state of the switch SW2 may serve as a "turn-off state".

As mentioned above, the switch SW1 may be provided on the positive electrode line 36. Controlling the switch SW1 to the ON state makes it possible to couple the first power supply system 51 and the second power supply system 52 to each other. Controlling the switch SW1 to the OFF state makes it possible to isolate the first power supply system 51 and the second power supply system 52 from each other. Moreover, controlling the switch SW1 to the ON state makes it possible to couple the electric devices 43 and the lithium ion battery 32 to each other. Controlling the switch SW1 to the OFF state makes it possible to isolate the electric devices 43 and the lithium ion battery 32 from each other.

The switch SW2 may be provided in the second power supply system 52. In one specific but non-limiting example, the switch SW2 may be provided between the starter generator 16 and the lithium ion battery 32 in the second power supply system 52. Controlling the switch SW2 to the ON state makes it possible to couple the starter generator 16 and the lithium ion battery 32 to each other. Controlling the switch SW2 to the OFF state makes it possible to isolate the starter generator 16 and the lithium ion battery 32 from each other. Moreover, controlling the switch SW2 to the ON state makes it possible to couple the electric devices 43 and the lithium ion battery 32 to each other. Controlling the switch SW2 to the OFF state makes it possible to isolate the electric devices 43 and the lithium ion battery 32 from each other.

The switches SW1 and SW2 may each be a switch including a semiconductor element such as a metal oxide semiconductor field effect transistor (MOSFET), or alternatively the switches SW1 and SW2 may each be a switch that causes a contact to mechanically open or close with the use of, for example but not limited to, electromagnetic force. The ON state of the switches SW1 and SW2 refers to an energized state that forms electrical coupling, or a conductive state. The OFF state of the switches SW1 and SW2 refers to a non-energized state that forms electrical isolation, or a cutoff state. It is to be noted that the switches SW1 and SW2 may be also referred to as, for example, a relay or a contactor.

As illustrated in FIG. 1, the power circuit 30 may include a battery module 54. The battery module 54 may include not only the lithium ion battery 32 but also the switches SW1 and SW2. The battery module 54 may further include a battery controller 55. The battery controller 55 may include, for example but not limited to, a microcomputer and various sensors. The battery controller 55 may have a function of monitoring, for example but not limited to, a state of charge SOC, a charge current, a discharge current, the terminal voltage, a cell temperature, and the internal resistance of the lithium ion battery 32. The battery controller 55 may also have a function of controlling the switches SW1 and SW2. It is to be noted that the state of charge SOC of the lithium ion battery 32 is hereinafter referred to as a "state of charge S_LiB".

[Control System]

Figure 3:
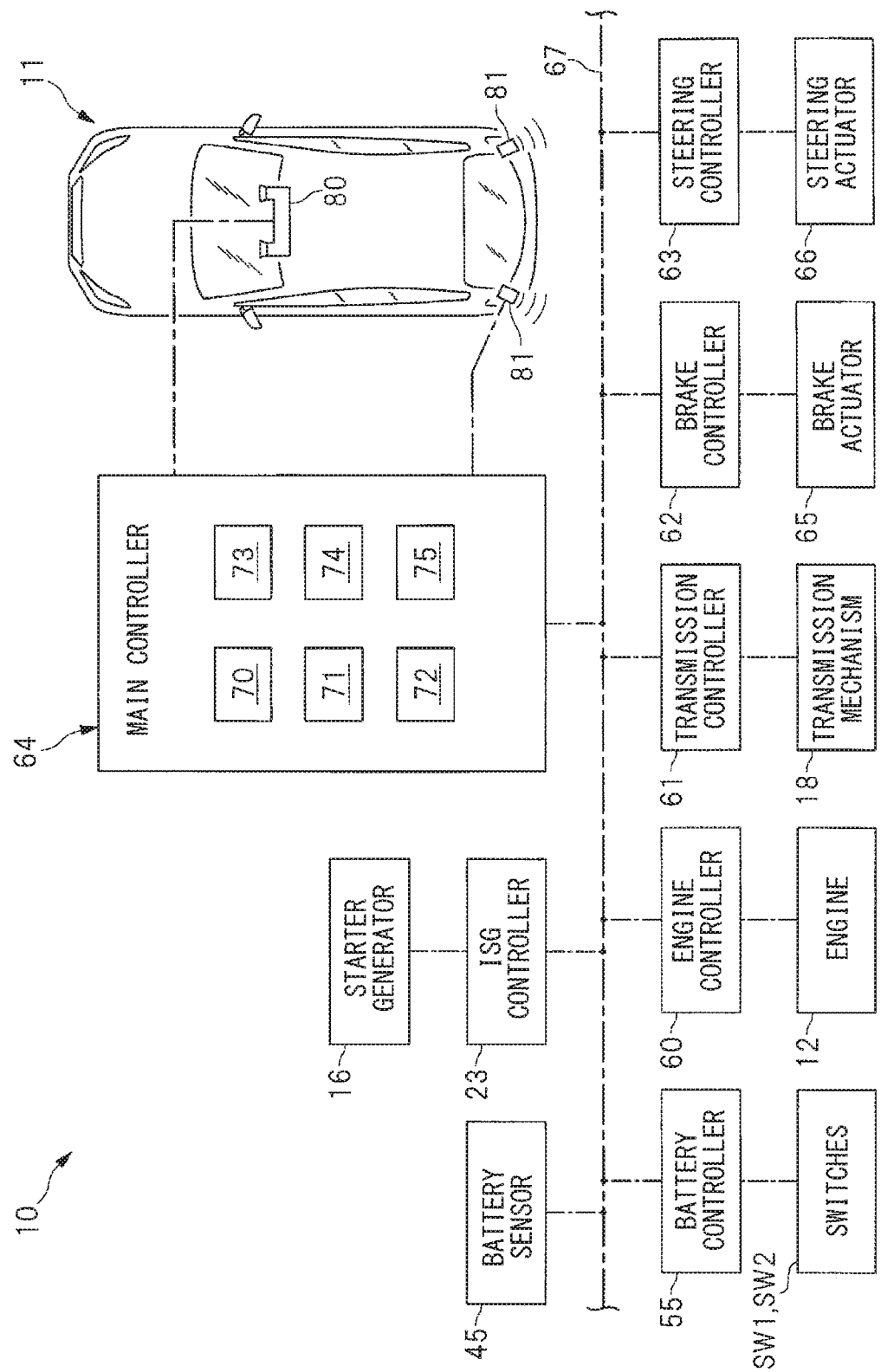
FIG. 3 is a block diagram of an example of a control system provided in the vehicle.

FIG. 3 is a block diagram of an example of a control system provided in the vehicle 11. As illustrated in FIG. 3, the vehicle 11 may include not only the ISG controller 23 and the battery controller 55 as mentioned above, but also an engine controller 60 and a transmission controller 61. The engine controller 60 may control the engine 12. The transmission controller 61 may control the transmission mechanism 18. The vehicle 11 may further include a brake controller 62 and a steering controller 63. The brake controller 62 may control a brake actuator 65 that makes braking of the one or more wheels 20. The steering controller 63 may control a steering actuator 66 that makes steering of the one or more wheels 20. Moreover, the vehicle 11 may further include a main controller 64. The main controller 64 may make a synthetic control of, for example but not limited to, the ISG controller 23, the battery controller 55, the engine controller 60, the transmission controller 61, the brake controller 62, and the steering controller 63. The ISG controller 23, the battery controller 55, the engine controller 60, the transmission controller 61, the brake controller 62, the steering controller 63, and the main controller 64 may include, for example but not limited to, a microcomputer, and be communicatively coupled to one another through an on-vehicle network 67 such as a controller area network (CAN) and a local interconnect network (LIN). Moreover, the ISG controller 23, the battery controller 55, the engine controller 60, the transmission controller 61, the brake controller 62, the steering controller 63, and the main controller 64 may be started up with the use of electric power from, for example, the lead battery 31. In other words, the ISG controller 23, the battery controller 55, the engine controller 60, the transmission controller 61, the brake controller 62, the steering controller 63, and the main controller 64 may each serve as one of the electric devices 43 that constitute the first power supply system 51.

In one embodiment of the technology, the ISG controller 23, the battery controller 55, the engine controller 60, the transmission controller 61, the brake controller 62, the steering controller 63, and the main controller 64 may each serve as an "electric load".

The main controller 64 may constitute part of the vehicle power supply apparatus 10, and have a function of controlling, for example but not limited to, the power unit 13 and the power circuit 30. The main controller 64 may include, for example but not limited to, an ISG control unit 70, a switch control unit 71, an engine control unit 72, and a driving control unit 73. The ISG control unit 70 may control the starter generator 16. The switch control unit 71 may control the switches SW1 and SW2. The engine control unit 72 may control the engine 12. The driving control unit 73 may execute an automated driving control. Because the main controller 64 may serve as one of the electric devices 43 as mentioned above, the ISG control unit 70, the switch control unit 71, the engine control unit 72, and the driving control unit 73 of the main controller 64 may each serve as one of the electric devices 43 as well. It is to be noted that the main controller 64 may control the starter generator 16 through the ISG controller 23, control the switches SW1 and SW2 through the battery controller 55, and control the engine 12 through the engine controller 60. Moreover, in executing the automated driving control described later, the main controller 64 may control the transmission mechanism 18 through the transmission controller 61, control the brake actuator 65 through the brake controller 62, and control the steering actuator 66 through the steering controller 63.

In one embodiment of the technology, the ISG control unit 70 may serve as a "power generation controller". In one embodiment of the technology, the ISG control unit 70, the switch control unit 71, the engine control unit 72, and the driving control unit 73 of the main controller 64 may each serve as an "electric load".

In order to execute the automated driving control, a front camera 80 and rear sideward radar 81, without limitation, may be coupled to the main controller 64. The front camera 80 may capture images frontward of the vehicle 11. The rear sideward radar 81 may detect obstacles rearward of the vehicle 11. The driving control unit 73 of the main controller 64 may make monitoring of situations of surroundings of the vehicle 11 on the basis of information from, for example but not limited to, the front camera 80 and the rear sideward radar 81, while making an automatic control of steering, acceleration, and deceleration of the vehicle 11 in accordance with the situations of the surroundings of the vehicle 11. For example, the driving control unit 73 may supply a control signal to the controllers in accordance with the situations of the surroundings of the vehicle 11, to control the engine 12, the transmission mechanism 18, the brake actuator 65, and the steering actuator 66, without limitation.

The automated driving control to be executed by the driving control unit 73 of the main controller 64 may include a driver assistance control. The driver assistance control includes allowing the driving control unit 73 of the main controller 64 to make part of driving operations automatically. Specific but non-limiting examples of such a driver assistance control include an adaptive cruise control, a lane keeping control, and an automatic brake control. The adaptive cruise control includes making accelerated or decelerated travel while following a preceding vehicle. The lane keeping control includes steering the one or more wheels 20 so as not to let the vehicle 11 deviate from a traveling lane. The automatic brake control includes braking the one or more wheels 20 in a case where the vehicle 11 comes close to an obstacle frontward of the vehicle 11. It is to be noted that in the forgoing description, the detection of the situations of the surroundings frontward of the vehicle 11 is made with the use of the front camera 80, while the detection of the situations of the surroundings rearward of the vehicle 11 is made with the use of the rear sideward radar 81. However, this is non-limiting. For example, the detection of the situations of the surroundings frontward of the vehicle 11 may be made with the use of radar, while the situations of the surroundings rearward of the vehicle 11 may be made with the use of a camera.

[Power Generation Control of Starter Generator]

Description is given next of a power generation control of the starter generator 16. The ISG control unit 70 of the main controller 64 may supply a control signal to the ISG controller 23, to control the starter generator 16 to a power generation state. The power generation state of the starter generator 16 may include a combustion power generation state and a regenerative power generation state described later. For example, in a case where the state of charge S_LiB of the lithium ion battery 32 lowers, the ISG control unit 70 may raise the power generation voltage of the starter generator 16, to control the starter generator 16 to the combustion power generation state. In a case where the state of charge S_LiB of the lithium ion battery 32 increases, the ISG control unit 70 may lower the power generation voltage of the starter generator 16, to control the starter generator 16 to a power generation suspended state.

Figure 4:
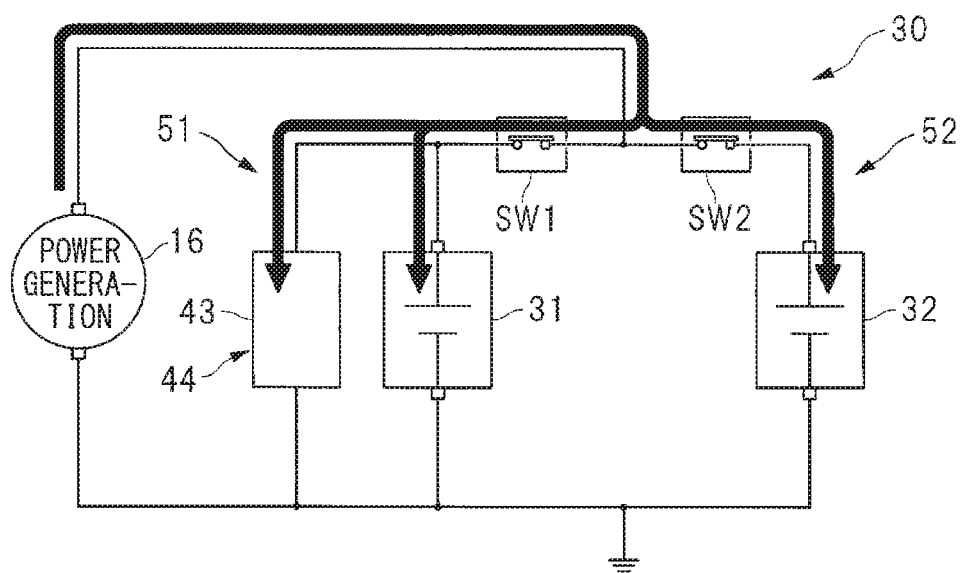
FIG. 4 is a diagram of an example of a situation as to how currents are supplied, with a starter generator controlled to a combustion power generation state.

FIG. 4 illustrates an example of a situation as to how currents are supplied, with the starter generator 16 controlled to the combustion power generation state. The combustion power generation state of the starter generator 16 means allowing, by engine power, the starter generator 16 to generate power, i.e., causing fuel combustion inside the engine 12 to allow the starter generator 16 to generate power. In one specific but non-limiting example, in a case where the state of charge S_LiB of the lithium ion battery 32 is lower than a predetermined value, the starter generator 16 may be allowed, by the engine power, to generate power, in order to charge the lithium ion battery 32. Thus, in controlling the starter generator 16 to the combustion power generation state, the power generation voltage of the starter generator 16 may be raised to a greater value than the terminal voltages of the lead battery 31 and the lithium ion battery 32. In this way, as denoted by black arrows in FIG. 4, currents may be supplied from the starter generator 16 to, for example, the lithium ion battery 32, the group of the electric devices 44, and the lead battery 31, causing the lithium ion battery 32 and the lead battery 31 to be charged slowly.

Figure 5:
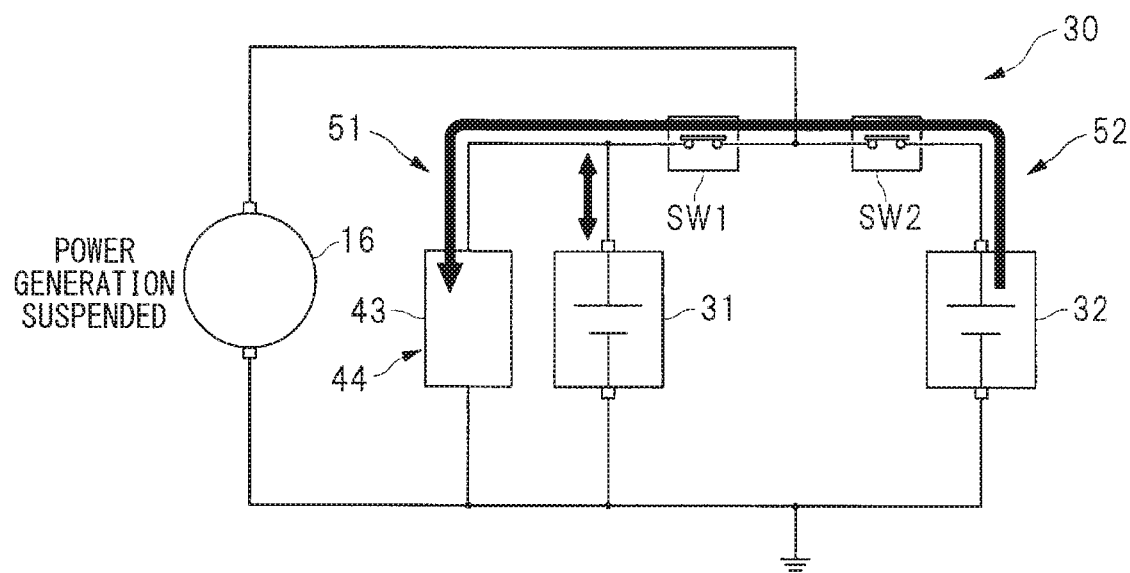
FIG. 5 is a diagram of an example of a situation as to how currents are supplied, with the starter generator controlled to a power generation suspended state.

FIG. 5 illustrates an example of a situation as to how currents are supplied, with the starter generator 16 controlled to the power generation suspended state. In one specific but non-limiting example, in a case where the state of charge S_LiB of the lithium ion battery 32 is higher than a predetermined value, power generation by the starter generator 16 with the use of the engine power may be stopped, in order to positively cause the discharge of the lithium ion battery 32. Thus, in controlling the starter generator 16 to the power generation suspended state, the power generation voltage of the starter generator 16 may be lowered to a smaller value than the terminal voltages of the lead battery 31 and the lithium ion battery 32. In this way, as denoted by black arrows in FIG. 5, a current may be supplied from the lithium ion battery 32 to the group of the electric devices 44. This makes it possible to stop the power generation by the starter generator 16, leading to reduction in an engine load. It is to be noted that it suffices for the power generation voltage of the starter generator 16 in the power generation suspended state to be a power generation voltage that allows the lithium ion battery 32 to discharge. For example, the power generation voltage of the starter generator 16 may be controlled to 0 (zero) V, or alternatively, the power generation voltage of the starter generator 16 may be controlled to a greater value than 0 (zero) V.

As mentioned above, the ISG control unit 70 of the main controller 64 may control the starter generator 16 to the combustion power generation state or the power generation suspended state on the basis of the state of charge S_LiB. Meanwhile, at the time of vehicle deceleration, it is desirable to recover much kinetic energy to enhance fuel consumption performance. Therefore, at the time of the vehicle deceleration, the power generation voltage of the starter generator 16 may be raised, to control the starter generator 16 to the regenerative power generation state. This makes it possible to increase power-generated electric power of the starter generator 16. It is therefore possible to positively convert the kinetic energy to electric energy and to recover the electric energy, leading to higher energy efficiency of the vehicle 11 and enhancement in the fuel consumption performance. A determination as to whether or not to execute regenerative power generation as described above may be made on the basis of, for example but not limited to, operation states of an accelerator pedal and a brake pedal. For example, on decelerated travel with a release of stepping down of the accelerator pedal, or on decelerated travel with stepping down of the brake pedal, the starter generator 16 may be controlled to the regenerative power generation state.

Figure 6:
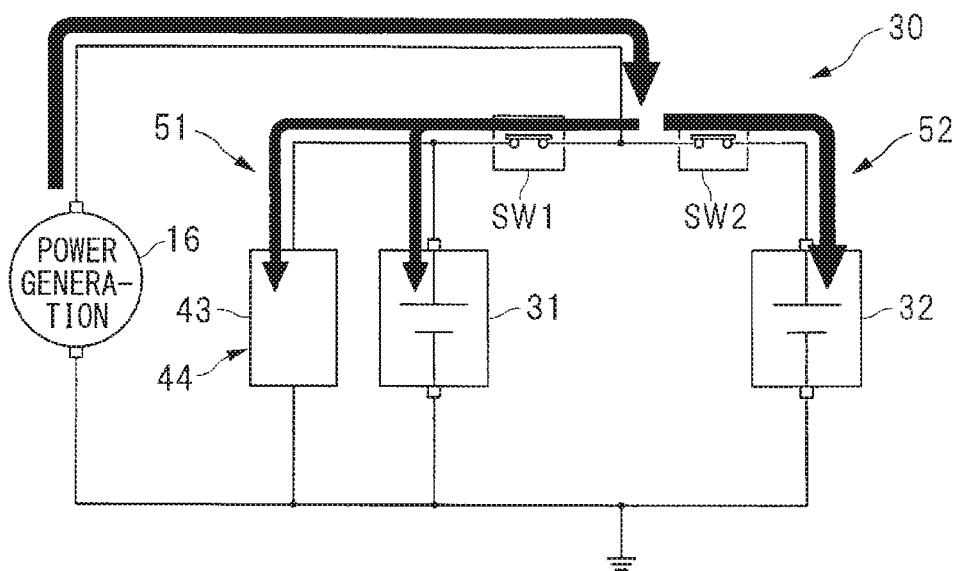
FIG. 6 is a diagram of an example of a situation as to how currents are supplied, with the starter generator controlled to a regenerative power generation state.

FIG. 6 illustrates an example of a situation as to how currents are supplied, with the starter generator 16 controlled to the regenerative power generation state. In controlling the starter generator 16 to the regenerative power generation state, the power generation voltage of the starter generator 16 may be raised to a higher value than in the combustion power generation state as mentioned above. This causes large current supply from the starter generator 16 to the lithium ion battery 32 and the lead battery 31, as denoted by black arrows in FIG. 6, resulting in rapid charge of the lithium ion battery 32 and the lead battery 31. Moreover, because the internal resistance of the lithium ion battery 32 is smaller than the internal resistance of the lead battery 31, most of the power-generated current is supplied to the lithium ion battery 32.

It is to be noted that as illustrated in FIGS. 4 to 6, in controlling the starter generator 16 to the combustion power generation state, the regenerative power generation state, and the power generation suspended state, the switches SW1 and SW2 may be kept in the ON state. In other words, in the vehicle power supply apparatus 10, it is possible to control the charge and the discharge of the lithium ion battery 32 solely by controlling the power generation voltage of the starter generator 16 without making a switching control of the switches SW1 and SW2. Hence, it is possible to easily control the charge and the discharge of the lithium ion battery 32, and to enhance durability of the switches SW1 and SW2.

Description now moves on to a changeover between the combustion power generation state and the power generation suspended state in the starter generator 16. As described, in the case where the state of charge S_LiB of the lithium ion battery 32 lowers, the starter generator 16 may be switched to the combustion power generation state. In the combustion power generation state of the starter generator 16, the power generation voltage may be raised to the greater value than the terminal voltage of the lithium ion battery 32, causing the charge of the lithium ion battery 32. Meanwhile, in the case where the state of charge S_LiB increases, the starter generator 16 may be switched to the power generation suspended state. In the power generation suspended state of the starter generator 16, the power generation voltage may be lowered to the smaller value than the terminal voltage of the lithium ion battery 32, which prompts the discharge of the lithium ion battery 32.

Figure 7:
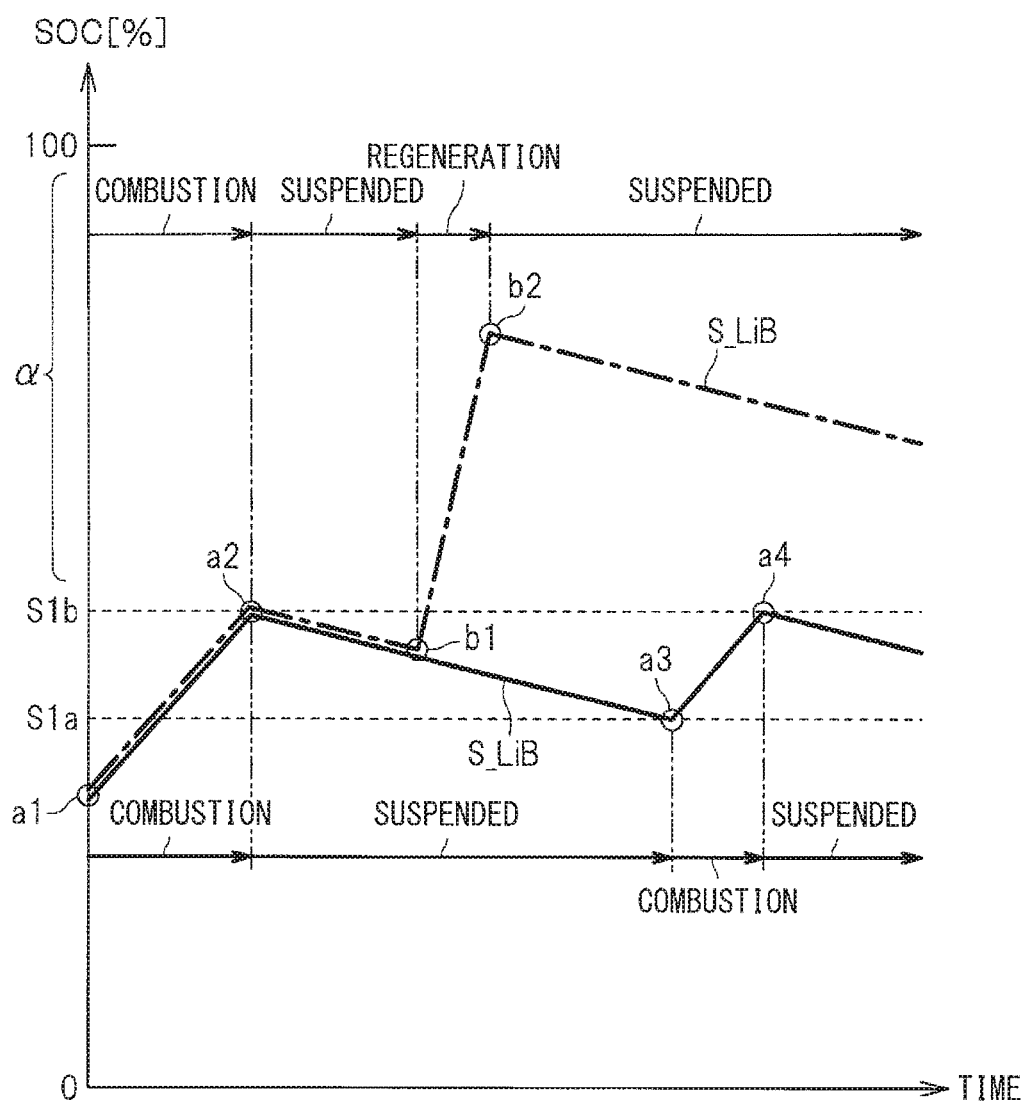
FIG. 7 is a diagram of an example of a situation as to how an ISG control unit makes a changeover between the combustion power generation state and the power generation suspended state.

FIG. 7 illustrates an example of a situation as to how the ISG control unit 70 makes the changeover between the combustion power generation state and the power generation suspended state. In FIG. 7, as denoted by reference characters a1, in a case where the state of charge S_LiB of the lithium ion battery 32 is lower than a predetermined power generation threshold S1$a$, the starter generator 16 may be controlled to the combustion power generation state. The state of charge S_LiB becomes greater, owing to the charge of the lithium ion battery 32, to reach a predetermined suspension threshold S1$b$ (reference characters a2), and thereupon, the starter generator 16 may be controlled to the power generation suspended state. Thereafter, the state of charge S_LiB becomes smaller, owing to the discharge of the lithium ion battery 32, to reach the power generation threshold S1$a$ (reference characters a3), and thereupon, the starter generator 16 may be controlled again to the combustion power generation state. Thereafter, the state of charge S_LiB of the lithium ion battery 32 increases to the suspension threshold S1$b$ (reference characters a4), and thereupon, the starter generator 16 may be controlled again to the power generation suspended state.

In other words, in the case where the state of charge S_LiB of the lithium ion battery 32 is lower than the power generation threshold S1$a$, the starter generator 16 may be controlled to the combustion power generation state. The combustion power generation state of the starter generator 16 may be continued until the state of charge S_LiB increases to reach the suspension threshold S1$b$. Meanwhile, in the case where the state of charge S_LiB of the lithium ion battery 32 is greater than the suspension threshold S1$b$, the starter generator 16 may be controlled to the power generation suspended state. The power generation suspended state of the starter generator 16 may be continued until the state of charge S_LiB lowers to reach the power generation threshold S1$a$.

In one embodiment of the technology, the power generation threshold S1$a$ may serve as a "first power generation threshold".

As described, controlling the starter generator 16 to the combustion power generation state and the power generation suspended state makes it possible to keep the state of charge S_LiB of the lithium ion battery 32 near the power generation threshold S1$a$ and the suspension threshold S1$b$. In other words, lowering the state of charge S_LiB of the lithium ion battery 32 to avoid a full charge state makes it possible to provide sufficient vacant capacity a of the lithium ion battery 32, and to control the starter generator 16 to the regenerative power generation state without missing a regeneration opportunity on the decelerated travel. That is, in FIG. 7, as denoted by an alternate long and short dashed line (reference characters b1 and b2), it is possible to control the starter generator 16 to the regenerative power generation state without missing the regeneration opportunity. Hence, it is possible to recover much electric power, leading to higher energy efficiency of the vehicle 11.

[Powering Control of Starter Generator]

Figure 8:
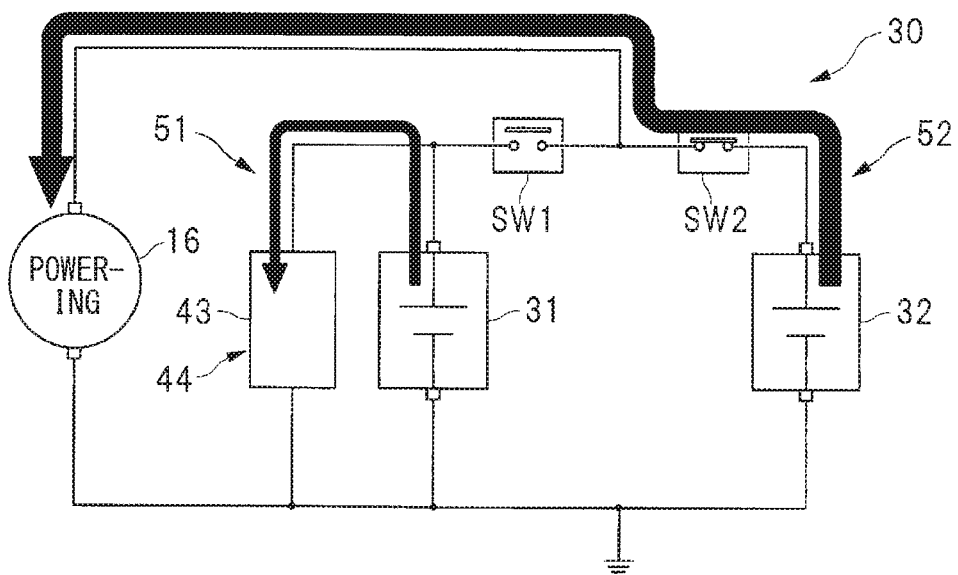
FIG. 8 is a diagram of an example of a situation as to how currents are supplied, with the starter generator controlled to a powering state.

Described next is a powering control of the starter generator 16. The ISG control unit 70 of the main controller 64 may control the starter generator 16 to the powering state, in the case of, for example, the restart of the engine 12 in the idling stop control. FIG. 8 illustrates an example of a situation as to how currents are supplied, with the starter generator 16 controlled to the powering state. As illustrated in FIG. 8, in controlling the starter generator 16 to the powering state at the restart of the engine 12 in the idling stop control, the switch SW1 may be switched from the ON state to the OFF state. This makes it possible to prevent an instantaneous voltage drop with respect to the group of the electric devices 44 even in a case with large current supply from the lithium ion battery 32 to the starter generator 16. It is therefore possible to allow the group of the electric devices 44, without limitation, to function normally.

It is to be noted that in the example illustrated in FIG. 8, in controlling the starter generator 16 to the powering state, the switch SW1 is switched to the OFF state. However, this is non-limiting. The starter generator 16 may be controlled to the powering state, with the switch SW1 kept in the ON state. Examples may include a motor assistance control in which the starter generator 16 provides assistance to the engine 12 at the time of the start and the acceleration. Power consumption of the starter generator 16 in the motor assistance control is smaller than power consumption of the starter generator 16 at the restart of the engine 12 as mentioned above. Accordingly, in the powering state of the starter generator 16, the switch SW1 may be kept in the ON state. Thus, in the motor assistance control that involves smaller power consumption, keeping the switch SW1 in the ON state hardly causes any large current flow from the lead battery 31 to the starter generator 16. Hence, it is possible to stabilize a power supply voltage of the group of the electric devices 44.

[Fail-Safe Control]

Description is given next of a fail-safe control to be executed by the vehicle power supply apparatus 10. As described, controlling the starter generator 16 to the combustion power generation state and the regenerative power generation state causes electric power supply from the starter generator 16 to the power circuit 30. This makes it possible to allow the group of the electric devices 44 inside the power circuit 30 to operate appropriately. However, in a case with an abnormality in the starter generator 16, i.e., in a case with a power generation failure of the starter generator 16, the electric power supply from the starter generator 16 is interrupted. This causes difficulties in allowing the group of the electric devices 44 to operate appropriately. Because the group of the electric devices 44 includes the controllers and the actuators, the abnormality in the starter generator 16 may constitute a possible cause of a shutdown of control subsystems such as automated driving as mentioned above.

Thus, the main controller 64 of the vehicle power supply apparatus 10 may execute the fail-safe control in the case with the abnormality in the starter generator 16. The fail-safe control may include continuing the electric power supply to the group of the electric devices 44 for predetermined time, to shut down the control subsystems appropriately. As illustrated in FIG. 3, the main controller 64 may include a fail-safe control unit 74 and an abnormality detection unit 75. The fail-safe control unit 74 may execute the fail-safe control. The abnormality detection unit 75 may detect the abnormality in the starter generator 16. It is to be noted that the abnormality detection unit 75 may detect an abnormal state that the starter generator 16 has the power generation failure, on the basis of, for example but not limited to, the power generation voltage and a power generation current of the starter generator 16, the terminal voltage, the charge current and the discharge current of the lithium ion battery 32, the terminal voltage, the charge current and the discharge current of the lead battery 31, and abnormality information to be transmitted from the ISG controller 23.

Figure 9:
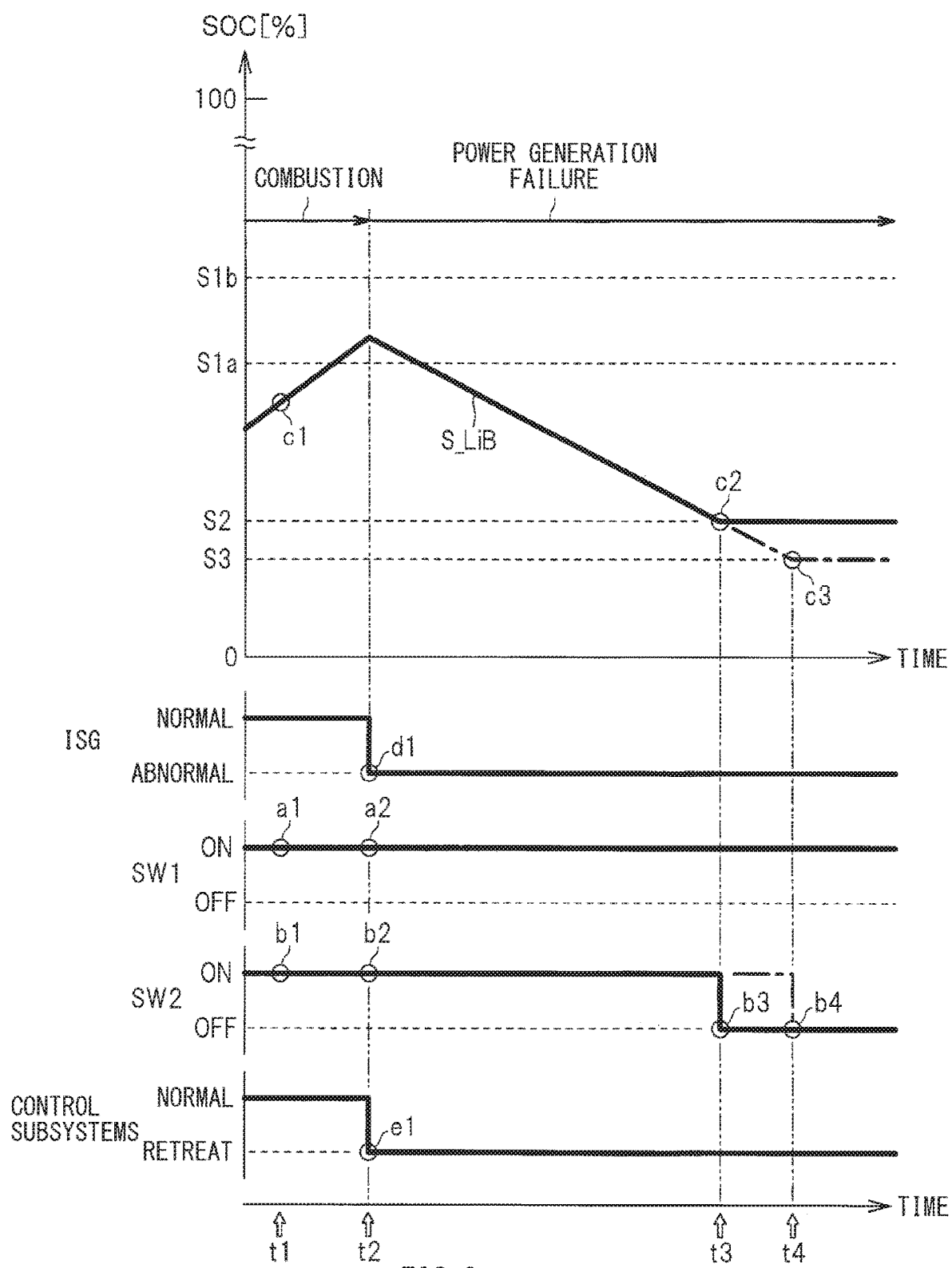
FIG. 9 is a timing chart of an example of a situation as to how switches operate and an example of a situation as to how a state of charge makes transitions, in a fail-safe control.
Figure 10A:
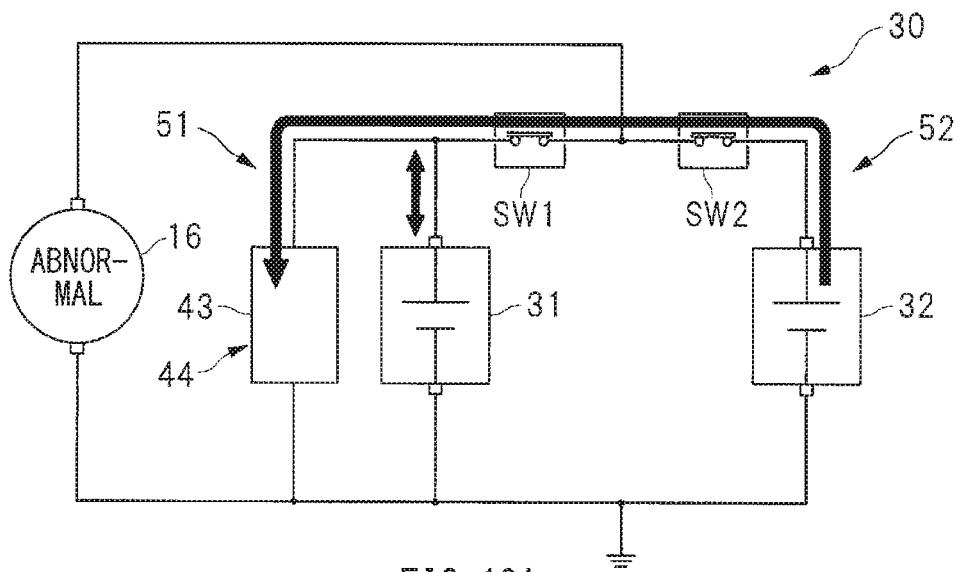
FIGS. 10A and 10B are diagrams of examples of situations as to how currents are supplied, in the fail-safe control.
Figure 10B:
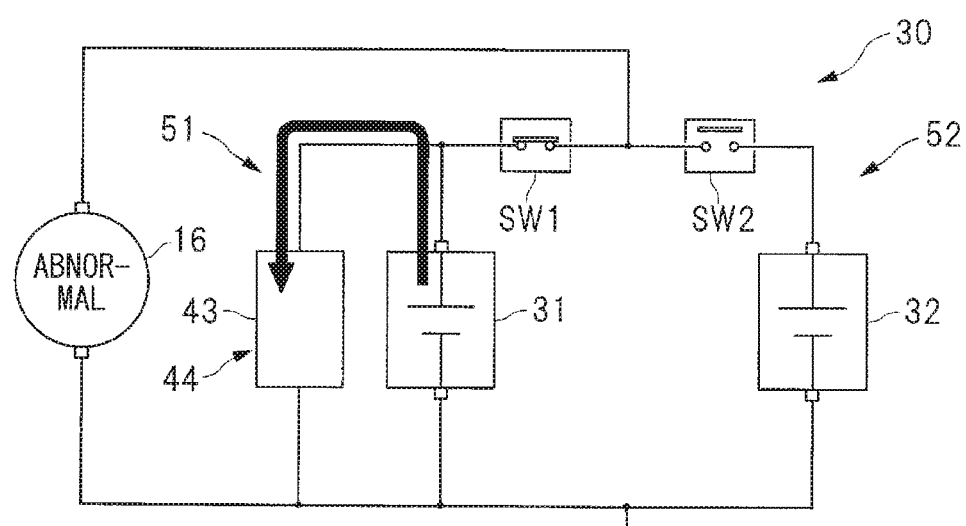

FIG. 9 is a timing chart of an example of a situation as to how the switches SW1 and SW2 operate and an example of a situation as to how the state of charge S_LiB makes transitions, in the fail-safe control. FIGS. 10A and 10B illustrate examples of situations as to how currents are supplied, in the fail-safe control. It is to be noted that in FIGS. 10A and 10B, black arrows indicate the situations as to how the currents are supplied.

First, referring to FIG. 9, at time t1, in the combustion power generation state of the starter generator 16, both the switches SW1 and SW2 may be controlled to the ON state (reference characters a1 and b1). This causes the lithium ion battery 32 to be charged by the starter generator 16 engaged in the power generation. Thus, the state of charge S_LiB of the lithium ion battery 32 increases gradually (reference characters c1). In the combustion power generation state of the starter generator 16 as mentioned above, at time t2, upon the starter generator 16 having the abnormality (reference characters d1), both the switches SW1 and SW2 may be kept in the ON state (reference characters a2 and b2). In other words, in the case with the abnormality in the starter generator 16, the switches SW1 and SW2 may be kept in the ON state, to maintain a coupling state of the lithium ion battery 32 and the group of the electric devices 44.

In this way, as illustrated in FIG. 10A, the group of the electric devices 44 is provided with electric power supply from the lithium ion battery 32. It is therefore possible to allow the group of the electric devices 44 to operate appropriately, though electric power supply from the starter generator 16 is interrupted. In other words, it is possible to maintain operation states of the control subsystems such as the automated driving, without an immediate shutdown of the control subsystems. Hence, it is possible to enhance reliability of the control subsystems. It is to be noted that as illustrated in FIG. 10A, in the case with the abnormality in the starter generator 16, both the lithium ion battery 32 and the lead battery 31 are coupled to the group of the electric devices 44. However, because the internal resistance of the lithium ion battery 32 is smaller than the internal resistance of the lead battery 31, most of electric power to be consumed by the group of the electric devices 44 is supplied from the lithium ion battery 32.

Moreover, the group of the electric devices 44 is provided with the electric power supply from the lithium ion battery 32, with the electric power supply from the starter generator 16 interrupted. This causes a gradual decrease in the state of charge S_LiB of the lithium ion battery 32. An excessive discharge of the lithium ion battery 32 may constitute a possible cause of considerable degradation in the lithium ion battery 32, and it is therefore important to prevent the excessive discharge of the lithium ion battery 32. Thus, as illustrated in FIG. 9, at time t3, the lithium ion battery 32 discharges, causing the state of charge S_LiB of the lithium ion battery 32 to lower to a lower limit threshold S2, and thereupon, the main controller 64 may switch the switch SW2 to the OFF state (reference characters b3). The lower limit threshold S2 may be smaller than the power generation threshold S1a.

In one embodiment of the technology, the power generation threshold S1a may serve as the "first power generation threshold". In one embodiment of the technology, the lower limit threshold S2 may serve as a "second power generation threshold".

As illustrated in FIG. 10B, controlling the switch SW2 to the OFF state as described causes the lithium ion battery 32 to be isolated from the group of the electric devices 44. Hence, it is possible to stop the discharge of the lithium ion battery 32, leading to prevention of the excessive discharge of the lithium ion battery 32. The lower limit threshold S2 is provided for comparison with the state of charge S_LiB. The lower limit threshold S2 may be set at a threshold value that hardly causes the considerable degradation in the lithium ion battery 32 even in a case with execution of the fail-safe control. In other words, the lower limit threshold S2 may be set at a threshold value that hardly necessitates replacement of the lithium ion battery 32. It is to be noted that the group of the electric devices 44 is provided with the electric power supply from the lead battery 31 even in the case where the lithium ion battery 32 is isolated from the group of the electric devices 44. Hence, it is possible to allow the group of the electric devices 44 to operate appropriately for predetermined time.

As described above, in the case with the abnormality in the starter generator 16, the main controller 64 controls the switch SW2 to the ON state and afterwards controls the switch SW2 to the OFF state. Moreover, the main controller 64 may control the switch SW2 to the ON state in the case where the starter generator 16 has the abnormality, and afterwards, the main controller 64 may control the switch SW2 to the OFF state in the case where the state of charge S_LiB of the lithium ion battery 32 is lower than the lower limit threshold S2. Thus, the group of the electric devices 44 is provided with the electric power supply from the lithium ion battery 32 until the state of charge S_LiB of the lithium ion battery 32 becomes lower than the lower limit threshold S2, even in the case with the abnormality in the starter generator 16. In other words, it is possible to provide the group of the electric devices 44 with the electric power supply, while preventing the excessive discharge of the lithium ion battery 32, even in the case with the abnormality in the starter generator 16. Hence, it is possible to allow the control subsystems of the vehicle 11 to operate appropriately.

As mentioned above, even in the case with the abnormality in the starter generator 16, it is possible to continue the electric power supply to the group of the electric devices 44 until the state of charge S_LiB of the lithium ion battery 32 reaches the lower limit threshold S2. It is therefore possible to allow the control subsystems of the vehicle 11 to operate appropriately. Thus, as illustrated in FIG. 9, at time t2, the starter generator 16 has the abnormality (reference characters d1), and thereupon, the main controller 64 may switch the control subsystems such as the automated driving from a normal mode to a retreat mode (reference characters e1). The retreat mode of the control subsystems means a control mode provided for an appropriate shutdown of the control subsystems. For example, in a case with execution of the automated driving control, making a transition from the normal mode to the retreat mode causes an advance notice of cancellation of the automated driving to be given by, for example, an alarm sound. Thus, the automated driving such as the steering, the acceleration, and the deceleration may be cancelled stepwise. Hence, it is possible to put an end to an automated driving situation carried on by the driving control unit 73 of the main controller 64, and to appropriately transfer authority of driving to an occupant. Moreover, in a case with execution of an assistance control of steering operations, making the transition from the normal mode to the retreat mode causes an advance notice of cancellation of the assistance control to be given by, for example, an alarm sound. Thus, assistance power of the steering actuator 66 may be lowered stepwise. Hence, it is possible to cancel the assistance control of the steering operations without giving a sense of incongruity to the occupant.

Figure 11:
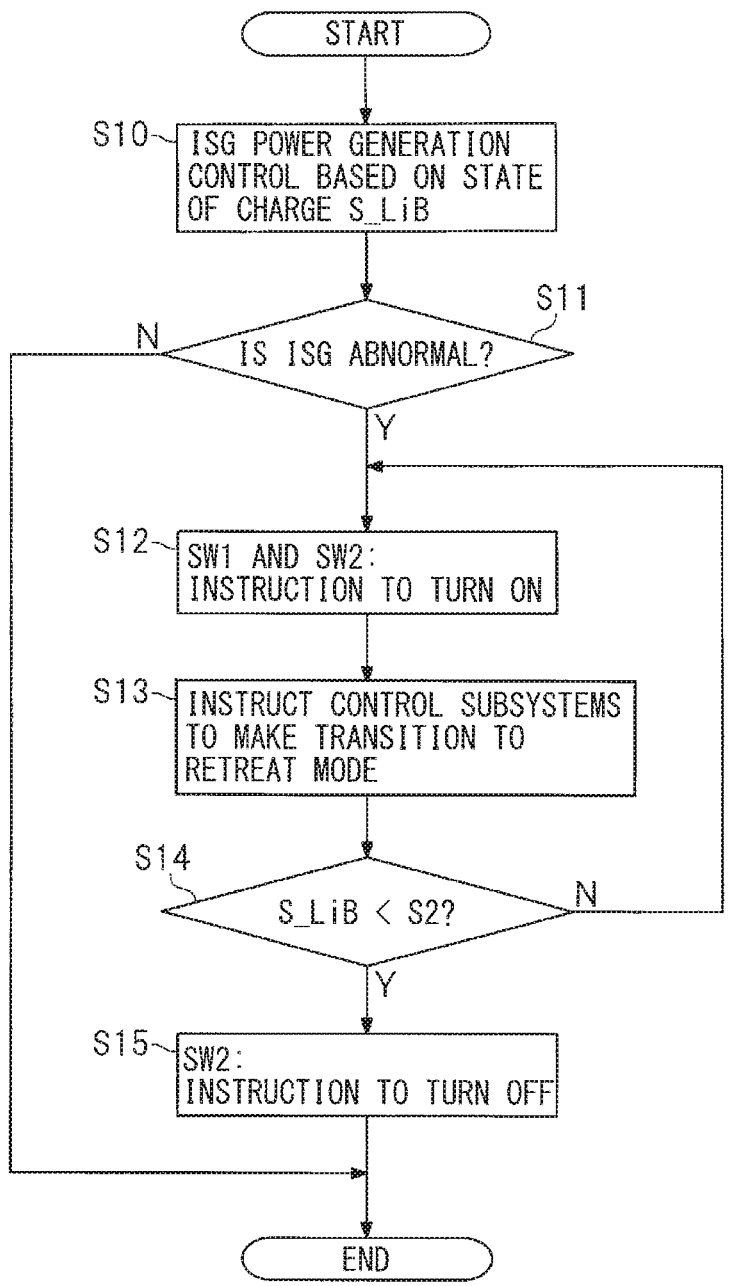
FIG. 11 is a flowchart of an example of an execution procedure in the fail-safe control.

Described next is an execution procedure of the forgoing fail-safe control, with reference to a flowchart. FIG. 11 is a flowchart of an example of the execution procedure of the fail-safe control. Referring to FIG. 11, in step S10, the power generation control of the starter generator 16 may be executed on the basis of the state of charge S_LiB of the lithium ion battery 32. In other words, in a case where the starter generator 16 is normal, when the state of charge S_LiB of the lithium ion battery 32 is lower than the power generation threshold S1a, the starter generator 16 may be controlled to the combustion power generation state. Thus, the state of charge S_LiB of the lithium ion battery 32 may be controlled to become greater than the power generation threshold S1a, e.g., 30%.

In one embodiment of the technology, the power generation threshold S1a may serve as the "first power generation threshold".

Thereafter, in step S11, a determination may be made as to whether or not the starter generator 16 has the abnormality. In step S11, in a case where a determination is made that the starter generator 16 has the abnormality (Y in step S11), the flow may proceed to step S12. In step S12, the switches SW1 and SW2 may be controlled to the ON state. Thereafter, the flow may proceed to step S13. In step S13, an instruction with respect to the control subsystems may be given to make the transition from the normal mode to the retreat mode. Thus, the retreat mode may be executed in which the group of the electric devices 44 is provided with the electric power supply from the lithium ion battery 32, to maintain the operation of the control subsystems and to cause the appropriate shutdown of the control subsystems.

Thereafter, in step S14, a determination may be made as to whether or not the state of charge S_LiB of the lithium ion battery 32 is lower than the lower limit threshold S2. In step S14, in a case where a determination is made that the state of charge S_LiB is lower than the lower limit threshold S2, e.g., 15% (Y in step S14), the flow may proceed to step S15. In step S15, the switch SW2 may be switched from the ON state to the OFF state, and the flow may be terminated. Meanwhile, in step S14, in a case where a determination is made that the state of charge S_LiB is equal to or greater than the lower limit threshold S2, the flow may proceed to step S12, in which the switches SW1 and SW2 may be kept in the ON state. Thereafter, the flow may proceed to step S13, in which the retreat mode of the control subsystems may be executed. In step S11, in a case where a determination is made that the starter generator 16 has no abnormality (N in step S11), the flow may be terminated.

In one embodiment of the technology, the lower limit threshold S2 may serve as the "second power generation threshold".

As described, in the case where the starter generator 16 has the abnormality, the operation of the control subsystems may be maintained by the electric power supply from the lithium ion battery 32 until the state of charge S_LiB of the lithium ion battery 32 becomes lower than the lower limit threshold S2, while the retreat mode may be executed. The retreat mode is provided for the appropriate shutdown of the control subsystems. In the case where the state of charge S_LiB of the lithium ion battery 32 becomes lower than the lower limit threshold S2, the switch SW2 may be switched to the OFF state, causing the isolation of the lithium ion battery 32 from the group of the electric devices 44. This makes it possible to prevent the excessive discharge of the lithium ion battery 32, and to avoid the replacement of the lithium ion battery 32. Hence, it is possible to reduce repair cost of the vehicle power supply apparatus 10.

Moreover, in the forgoing description, in the case where the state of charge S_LiB of the lithium ion battery 32 becomes lower than the lower limit threshold S2, the switch SW2 provided in the second power supply system 52 is switched to the OFF state, causing the isolation of the lithium ion battery 32 from the group of the electric devices 44. However, this is non-limiting. For example, in the case where the state of charge S_LiB of the lithium ion battery 32 becomes lower than the lower limit threshold S2, the switch SW1 provided on the positive electrode line 36 may be switched to the OFF state, with the switch SW2 kept in the ON state. Switching the switch SW1 to the OFF state in this way also makes it possible to isolate the lithium ion battery 32 from the group of the electric devices 44. Hence, it is possible to prevent the excessive discharge of the lithium ion battery 32. It is to be noted that in the case where the state of charge S_LiB of the lithium ion battery 32 becomes lower than the lower limit threshold S2, both the switches SW1 and SW2 may be switched to the OFF state, instead of switching the switch SW1 or the switch SW2 to the OFF state.

In the forgoing description, the single lower limit threshold S2 may be set as the lower limit threshold provided for the comparison with the state of charge S_LiB. However, this is non-limiting. A plurality of lower limit thresholds may be set. For example, as illustrated in FIG. 9, the lower limit threshold S2 and a lower limit threshold S3 smaller than the lower limit threshold S2 may be set as the lower limit thresholds provided for the comparison with the state of charge S_LiB. In the case with the setting of the plurality of the lower limit thresholds S2 and S3, it is possible to use separately the lower limit thresholds S2 and S3 for the comparison with the state of charge S_LiB, in accordance with the operation states of the control subsystems. For example, in a case where the starter generator 16 has the abnormality during a stop of the automated driving control, the state of charge S_LiB may be compared with the lower limit threshold S2, i.e., a greater one of the lower limit thresholds. In a case where the starter generator 16 has the abnormality during execution of the automated driving control, the state of charge S_LiB may be compared with the lower limit threshold S3, i.e., a smaller one of the lower limit thresholds.

In other words, as illustrated in FIG. 9, in the case where the starter generator 16 has the abnormality, with the automated driving control stopped, the switch SW2 may be switched to the OFF state (reference characters b3) at timing when the state of charge S_LiB becomes lower than the lower limit threshold S2, e.g., 15% (at time t3, reference characters c2). In a case where the starter generator 16 has the abnormality, with the automated driving control executed, the switch SW2 may be switched to the OFF state (reference characters b4) at timing when the state of charge S_LiB becomes lower than the lower limit threshold S3, e.g., 10% (at time t4, reference characters c3). In this way, in the case with the automated driving control executed, it is possible to lengthen time it takes for the lithium ion battery 32 to be isolated from the group of the electric devices 44. This makes it possible to take sufficient time for the retreat mode to be executed, leading to a more appropriate shutdown of the automated driving control. In the case where the automated driving control is stopped, it is possible to suppress the state of charge S_LiB from lowering. Hence, it is possible to prevent the degradation in the lithium ion battery 32.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. In the forgoing example embodiments, the switch SW2 is controlled to the ON state in the case where the starter generator 16 has the abnormality. Afterwards, the switch SW2 may be controlled to the OFF state in the case where the state of charge S_LiB becomes smaller than the lower limit threshold S2. However, this is non-limiting. For example, the switch SW2 may be controlled to the ON state in the case where the starter generator 16 has the abnormality, and thereafter, the switch SW2 may be controlled to the OFF state after a lapse of predetermined set time. Moreover, in the forgoing example embodiments, the starter generator 16 may serve as the "generator", but this is non-limiting. For example, an alternator may serve as the "generator".

Furthermore, in the forgoing example embodiments, the lead battery 31 may serve as the "first electrical energy accumulator", but this is non-limiting. Other kinds of batteries or capacitors may be adopted as the "first electrical energy accumulator". Moreover, in the forgoing example embodiments, the lithium ion battery 32 may serve as the "second electrical energy accumulator", but this is non-limiting. Other kinds of batteries or capacitors may be adopted as the "second electrical energy accumulator".

In addition, in the forgoing example embodiments illustrated in FIGS. 1 and 2, the switch SW2 is provided on the positive electrode line 34 of the lithium ion battery 32, but this is non-limiting. For example, as denoted by an alternate long and short dashed line in FIG. 2, the switch SW2 may be provided on the negative electrode line 39 of the lithium ion battery 32. In this example embodiment, in the case where the state of charge S_LiB of the lithium ion battery 32 becomes lower than the lower limit threshold S2, the switch SW1 provided on the positive electrode line 36 may be switched to the OFF state. This makes it possible to isolate the lithium ion battery 32 from the group of the electric devices 44. Hence, it is possible to prevent the excessive discharge of the lithium ion battery 32.

Moreover, in the forgoing example embodiments, the main controller 64 includes the ISG control unit 70, the switch control unit 71, the engine control unit 72, the driving control unit 73, the fail-safe control unit 74, and the abnormality detection unit 75, but this is non-limiting. The ISG control unit 70, the switch control unit 71, the engine control unit 72, the driving control unit 73, the fail-safe control unit 74, or the abnormality detection unit 75, or any combination thereof may be provided in other controllers, or alternatively, the ISG control unit 70, the switch control unit 71, the engine control unit 72, the driving control unit 73, the fail-safe control unit 74, and the abnormality detection unit 75 may be distributed over a plurality of controllers.

The main controller 64, the ISG control unit 70, the switch control unit 71, the engine control unit 72, the driving control unit 73, the fail-safe control unit 74, and the abnormality detection unit 75 illustrated in FIGS. 1 and 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 64, the ISG control unit 70, the switch control unit 71, the engine control unit 72, the driving control unit 73, the fail-safe control unit 74, and the abnormality detection unit 75. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 64, the ISG control unit 70, the switch control unit 71, the engine control unit 72, the driving control unit 73, the fail-safe control unit 74, and the abnormality detection unit 75 illustrated in FIGS. 1 and 3.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle power supply apparatus to be mounted on a vehicle that includes an engine, the vehicle power supply apparatus comprising:
   a first power supply system including a first electrical energy accumulator and an electric load coupled to the first electrical energy accumulator;
   a second power supply system including a generator and a second electrical energy accumulator, the generator being coupled to the engine, the second electrical energy accumulator being able to be coupled to the generator;
   a power generation controller configured to, in a normal condition of the generator:
      when a state of charge of the second electrical energy accumulator falls below a first power generation threshold, control the generator to a combustion power generation state in which a power generation voltage of the generator is raised to a value greater than a terminal voltage of the second electrical energy accumulator to increase the state of charge of the second electrical energy accumulator toward a second power generation threshold greater than the first power generation threshold; and
      when the state of charge of the second electrical energy accumulator increases to the second power generation threshold, control the generator from combustion power generation state to a power generation suspended state in which the power generation voltage of the generator is lowered to the value smaller than the terminal voltage of the second electrical energy accumulator,
      wherein the power generation controller is configured to maintain the generator in the power generation suspended state until the state of charge of the second electrical energy accumulator falls below the first power generation threshold;
   an electrical conduction path provided between the first power supply system and the second power supply system and configured to couple the first electrical energy accumulator and the second electrical energy accumulator in parallel to each other;
   a switch configured to be controlled to a turn-on state and a turn-off state, the turn-on state including coupling the first power supply system and the second power supply system to each other, and the turn-off state including isolating the first power supply system and the second power supply system from each other; and
   a switch controller configured to:
      when a power generation failure in which the combustion power generation state of the generator is interrupted is detected while the generator in the combustion power generation state to increase the state of charge of the second electrical energy accumulator toward the second power generation threshold but before the state of charge of the second electrical energy accumulator reaches the second power generation threshold, control the switch to be maintained at the turn-on state; and
      when the state of charge of the second electrical energy accumulator falls to a third power generation threshold after the power generation failure is detected, control the switch to the turn-off state,
   wherein the third power generation threshold is smaller than the first power generation threshold.

2. The vehicle power supply apparatus according to claim 1, wherein the switch is provided in the second power supply system.

3. The vehicle power supply apparatus according to claim 2, wherein the switch is provided between the generator and the second electrical energy accumulator in the second power supply system.

4. The vehicle power supply apparatus according to claim 1, wherein the switch is provided on the electrical conduction path.

5. The vehicle power supply apparatus according to claim 1, wherein
   the switch includes a plurality of switches each of which is configured to be controlled to the turn-on state and the turn-off state, and
   the switch controller controls the plurality of the switches to the turn-on state in response to the power generation failure that occurs in the generator, and afterwards controls one or more out of the plurality of the switches to the turn-off state.

6. The vehicle power supply apparatus according to claim 5, wherein
   the plurality of the switches includes a first switch and a second switch, the first switch being provided on the electrical conduction path, and the second switch being provided between the generator and the second electrical energy accumulator in the second power supply system, and
   the switch controller controls the first switch and the second switch to the turn-on state in response to the power generation failure that occurs in the generator, and afterwards controls the first switch or the second switch, or both to the turn-off state.

7. The vehicle power supply apparatus according to claim 1, wherein internal resistance of the second electrical energy accumulator is smaller than internal resistance of the first electrical energy accumulator.

8. The vehicle power supply apparatus according to claim 1, further comprising a driving controller configured to execute an automated driving control of the vehicle, the driving controller serving as the electric load of the first power supply system.

9. The vehicle power supply apparatus according to claim 1, wherein
   the electric load comprises a driving controller configured to perform execution of an automated driving control of the vehicle,
   in a case where, during the execution of the automated driving control, the switch controller has controlled the switch to the turn-on state in response to the power generation failure that occurs in the generator, the switch controller controls the switch to the turn-off state, and
   in a case where, during a stop of the automated driving control, the switch controller has controlled the switch to the turn-on state in response to the power generation failure that occurs in the generator, and the switch controller controls the switch to the turn-off state.

10. A vehicle power supply apparatus to be mounted on a vehicle that includes an engine, the vehicle power supply apparatus comprising:
   a first power supply system including a first electrical energy accumulator and an electric load coupled to the first electrical energy accumulator;
   a second power supply system including a generator and a second electrical energy accumulator, the generator being coupled to the engine, the second electrical energy accumulator being able to be coupled to the generator;

a power generation controller configured to, in a normal condition of the generator:
    when a state of charge of the second electrical energy accumulator falls below a first power generation threshold, control the generator to a combustion power generation state in which a power generation voltage of the generator is raised to a value greater than a terminal voltage of the second electrical energy accumulator to increase the state of charge of the second electrical energy accumulator toward a second power generation threshold greater than the first power generation threshold; and
    when the state of charge of the second electrical energy accumulator increases to the second power generation threshold, control the generator from combustion power generation state to a power generation suspended state in which the power generation voltage of the generator is lowered to the value smaller than the terminal voltage of the second electrical energy accumulator,
wherein the power generation controller is configured to maintain the generator in the power generation suspended state until the state of charge of the second electrical energy accumulator falls below the first power generation threshold;
an electrical conduction path provided between the first power supply system and the second power supply system and configured to couple the first electrical energy accumulator and the second electrical energy accumulator in parallel to each other;
a switch configured to be controlled to a turn-on state and a turn-off state, the turn-on state including coupling the first power supply system and the second power supply system to each other, and the turn-off state including isolating the first power supply system and the second power supply system from each other; and circuitry configured to:
    when a power generation failure in which the combustion power generation state of the generator is interrupted is detected while the generator in the combustion power generation state to increase the state of charge of the second electrical energy accumulator toward the second power generation threshold but before the state of charge of the second electrical energy accumulator reaches the second power generation threshold, control the switch to be maintained at the turn-on state; and
    when the state of charge of the second electrical energy accumulator falls to a third power generation threshold after the power generation failure is detected, control the switch to the turn-off state,
    wherein the third power generation threshold is smaller than the first power generation threshold.

11. The vehicle power supply apparatus according to claim 10, wherein
    the electric load comprises a driving controller configured to perform execution of an automated driving control of the vehicle,
    in a case where, during the execution of the automated driving control, the circuitry has controlled the switch to the turn-on state in response to the power generation failure that occurs in the generator, the circuitry controls the switch to the turn-off state, and
    in a case where, during a stop of the automated driving control, the circuitry has controlled the switch to the turn-on state in response to a power generation failure that occurs in the generator, the circuitry controls the switch to the turn-off state.

* * * * *